(12) United States Patent
Acharya et al.

(10) Patent No.: US 6,502,062 B1
(45) Date of Patent: Dec. 31, 2002

(54) SYSTEM AND METHOD FOR SCHEDULING DATA DELIVERY USING FLOW AND STRETCH ALGORITHMS

(75) Inventors: Swarup Acharya, New Providence, NJ (US); Shanmugavelayut Muthukrishnan, New York, NY (US); Ganapathy Sundaram, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/337,865

(22) Filed: Jun. 21, 1999

(51) Int. Cl.$^7$ ............................................. G06F 13/00
(52) U.S. Cl. ...................... 702/186; 702/122; 702/125; 702/177; 702/182; 702/188
(58) Field of Search ................................ 702/119, 122, 702/125, 176–178, 179, 182–185, 186, 187, 188, FOR 103, FOR 104, FOR 134, FOR 135, FOR 139, FOR 170, FOR 171; 709/231, 223, 224, 225

(56) References Cited

U.S. PATENT DOCUMENTS

| | | | | |
|---|---|---|---|---|
| 4,894,846 A | * | 1/1990 | Fine | 375/107 |
| 5,396,613 A | * | 3/1995 | Hollaar | 395/575 |
| 5,588,148 A | * | 12/1996 | Landis et al. | 395/601 |
| 5,790,805 A | * | 8/1998 | Bantum | 395/200.78 |
| 5,835,724 A | * | 11/1998 | Smith | 395/200.57 |
| 5,892,535 A | * | 4/1999 | Allen et al. | 348/9 |
| 5,913,041 A | * | 6/1999 | Ramanathan et al. | 395/200.63 |
| 6,016,319 A | * | 1/2000 | Kshirsagar et al. | 370/410 |
| 6,016,508 A | * | 1/2000 | Chu et al. | 709/223 |
| 6,112,221 A | * | 8/2000 | Bender et al. | 709/102 |
| 6,131,121 A | * | 10/2000 | Mattaway et al. | 709/227 |
| 6,138,163 A | * | 10/2000 | Nam et al. | 709/231 |
| 6,151,632 A | * | 11/2000 | Chaddha et al. | 709/231 |
| 6,169,997 B1 | * | 1/2001 | Papierniak et al. | 707/501 |
| 6,175,822 B1 | * | 1/2001 | Jones | 704/270 |
| 6,182,086 B1 | * | 1/2001 | Lomet et al. | 707/202 |

OTHER PUBLICATIONS

Peterson et al. US 2001/0003828 A1. Jun. 14, 2001.*
S. Acharya and S. Muthukrishma. Scheduling on –demand broadcast: New metrics and algorithms. In Proc. of IEE/ACM Mobicom, Dallas, Oct. 1998.
M. Bender, S Chakrabari, and S. Muthukrishna. Flow and stretch metrics for scheduling continuous job streams. In Proceedings of the Ninth Annual ACM–SIAM Symposium on Discrete Algorithms, pp. 270–279, San Francisco, California, Jan. 25–27, 1998.
M. Crovella, M Harchol–Balter, and C. Murta. Task Assignment in a distributed system: Improving performance by unbalancing load. Technical Report 97–018, Boston University, Oct. 31, 1997.

(List continued on next page.)

Primary Examiner—Marc S. Hoff
Assistant Examiner—Carol S W Tsai
(74) Attorney, Agent, or Firm—Sofer & Haroun, LLP (57) ABSTRACT

In accordance with one embodiment, a method for scheduling the servicing of job requests in a point-to-point communication system having a central server providing job requests to a plurality of local channel servers. In a first step, the method receives a new job request at a central server. A performance of each local channel server is measured, and the job request is dispatched to one of the local channel servers for servicing thereby dependent upon the performance of each of the local channel servers. In one embodiment, the job request is dispatched to the local channel servers having the lowest current average flow time. In another embodiment, the job request is dispatched to the local channel server having the lowest current maximum stretch value, wherein a stretch value is a ratio equal to an amount of time required to service a job request while also serving other uncompleted job requests, divided by an amount of time required to service said job request if no other job requests were required to be serviced.

26 Claims, 6 Drawing Sheets

OTHER PUBLICATIONS

M. Crovella, M. Harchol–Balter, and S. Park. The case SRPT scheduling in web serves. Technical report, Boston University, Oct. 31, 1998.

H. Zhang. Service Disciplines For Guaranteed Performance Service in Packet–Switching Networks.

J. Gehrke, S. Muthukrishnan, R. Rajaraman, and A. Shaheen. Scheduling to Minimize Average Stretch. Technical Report 99—Jan. 2, 1999.

H. Kellerer, T. Tautenhahn, and G.. J. Woeginger. Approximability and non approximability results for minimizing total flow time on a single machine. In Proc of $28^{th}$ ACM Symp on Theory of Computing, pp. 418–246, 1996.

S. Leonardi and D. Raz. Approximating total flow time on parallel machines. In Proc of $29^{th}$ ACM Symp on Theory of Computing, 1997.

H. Balakrishnan, V. Padmanabahn, S. Seshan, and R. Katz. A comparison of Mechganics for Improving TCP Performance over Wireless Links. Proc. ACM SIGCOMM 96. Stanford CA, Aug. 1996.

M. Corvella, R. Frangioso, and M. Harchol–Balter. Connection Scheduling in Web Servers. Technical Report BUC-S–TR–99–003 Apr. 10, 1999.

H. Schwetman. CSIM: A C–Based Process–Oriented Simulation Language. Proceeding of 1986 Winter Simulation Conference.

D.J. Goodman, J. Borras, N.B. Mandayam, and R.D. Yates. Infostations: A new system model for data and messaging services. Proceedings of IEEE VTC '97 vol. 2, pp. 969–973, Phoenix, May 1997.

A. Bakre and B.R. Badrinath. Handoff and System Support for Indirect TCP/IP. Department of Computer Science, Rutgers University.

D. Ferrari and D. Verma. A Scheme for Real–Time Channel Establishment in Wide Area Networks.

N. Vadya and S. Hameed. Data broadcast in asymmetric wireless environments. In First International Workshop on Satellite–based Information Services (WOSBIS), 1996.

* cited by examiner

FIG. 1
SYSTEM MODEL

| ALGORITHM | STRETCH | | RESPONSE TIME (sec) | |
|---|---|---|---|---|
| | MAXIMUM | AVERAGE | MAXIMUM | AVERAGE |
| LdBal | 128.1 | 4.2 | 10085 | 11.9 |
| MinFlow | 120.6 | 1.2 | 12463 | 4.8 |
| MinStr | 78.7 | 1.3 | 12019 | 5.2 |

LOCAL SCHEDULING PERFORMANCE, PER-CHANNEL SCHEDULE: MAX

FIG. 7

| ALGORITHM | STRETCH | | RESPONSE TIME (sec) | |
|---|---|---|---|---|
| | MAXIMUM | AVERAGE | MAXIMUM | AVERAGE |
| LdBal | 259.4 | 4.0 | 10179 | 12.8 |
| MinFlow | 305.2 | 1.3 | 11702 | 4.6 |
| MinStr | 112.1 | 1.3 | 12593 | 4.9 |

LOCAL SCHEDULING PERFORMANCE, PER-CHANNEL SCHEDULE: SRPT

SYSTEM AND METHOD FOR SCHEDULING DATA DELIVERY USING FLOW AND STRETCH ALGORITHMS

FIELD OF THE INVENTION

This invention relates generally to communication systems, and more particularly to the scheduling of job requests to be serviced in a multiple-channel, point-to-point system.

BACKGROUND OF THE INVENTION

The boom in the Internet and the rise of new network technologies have focused attention on designing faster and more efficient data networks. A key component of the data network is the data server. Data servers are the engines that store and feed content to diverse clients over the network media. Data servers can take many forms, such as infestations, wireless gateways, web servers or specialized servers such as traffic or weather information servers. Increasingly, data servers employ a multiple-channel, point-to-point model.

Figure 1:
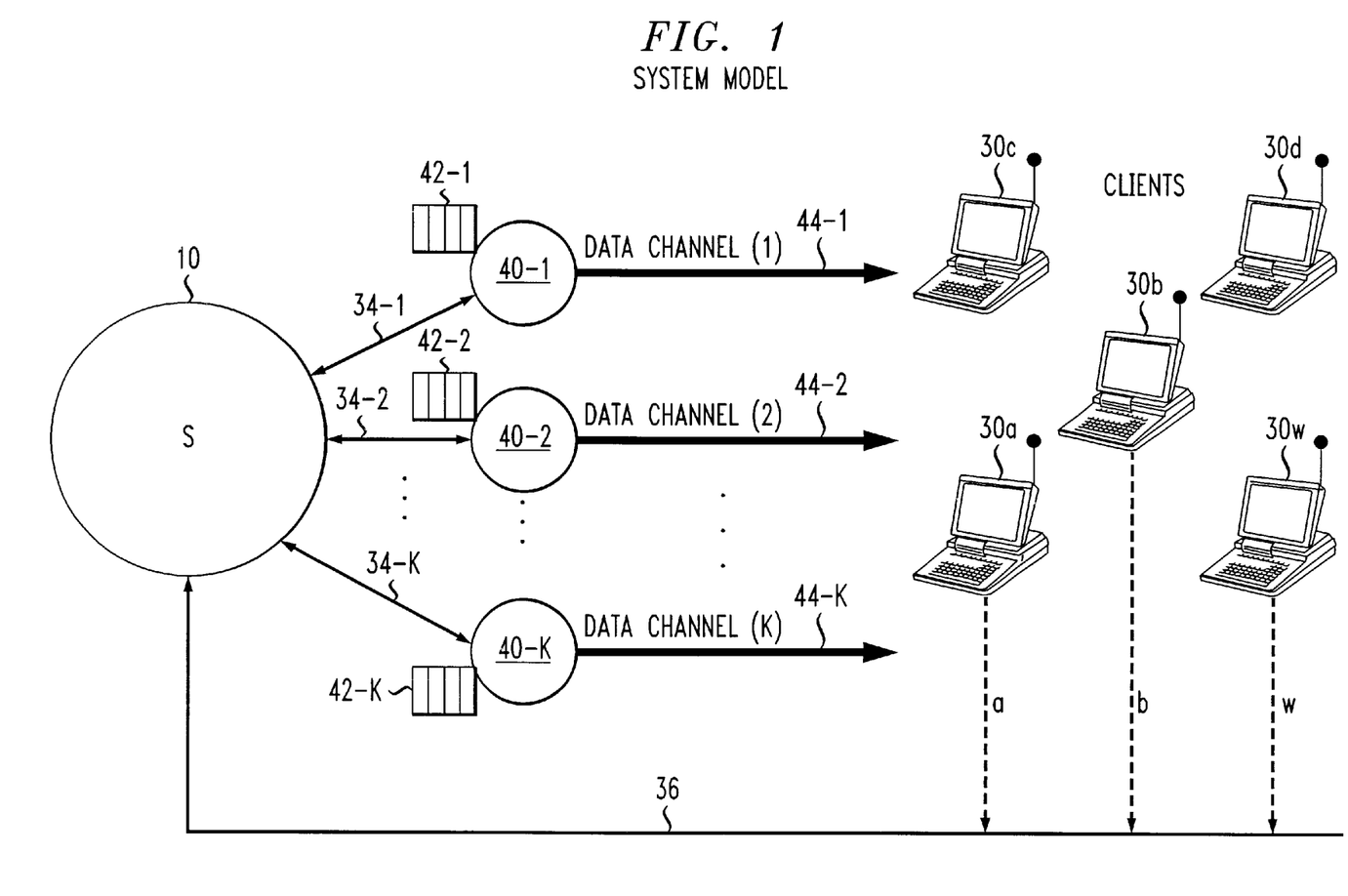
FIG. 1 illustrates a localized multiple-channel, point-to-point communication system, as employed in one embodiment of the present invention.

For example, FIG. 1 illustrates a typical multiple-channel communication system of the prior art, which satisfies job requests in a point-to-point, or unicast, fashion. In a point-to-point system, each client's request for data is required to be individually satisfied, even if more than one client makes a job request for the same data item. In this regard, a point-to-point system is different from a broadcast system, which is used to advantage by satisfying all of the pending job requests for a data item with a single broadcast of the data item. One of many examples of a point-to-point system is an Internet server which provides web page data in response to requests from different Internet users.

In FIG. 1, devices 30a through 30w make requests for data which are delivered to central server 10 by any method. Specifically, device 30a makes a job request for data item a, device 30b makes a job request for data item b, and device 30w makes a job request for data item w. Central server 10 receives the job requests and retrieves the requested data from either an internal database or an external database (as will be shown below). Central server 10 then transmits the job request to one of a plurality of local channel servers, designated as 40-1 through 40-k. Each local channel server has a corresponding data channel, designated as 44-1 through 44-k. When the job request is received by one of the local channel servers, the local channel server then services the job request by transmitting the requested data to the requesting device via its corresponding channel.

Additionally, a scheduling method is employed by the system. The scheduling system determines the order in which the job requests are serviced. In the prior art, one method which is typically employed for this purpose is a centralized scheduling method. According to a centralized scheduling method, the central server has a corresponding queue and employs a scheduling algorithm in order to determine which of the jobs pending in its queue are sent to the local channel servers to be serviced. However, a centralized scheduling arrangement has a high overhead. Specifically, a large amount of memory is required to store the pending job requests in the central server's single queue, and the computational complexity of scheduling all of these jobs simultaneously requires very high processing power.

Another method of the prior art which is typically employed for this purpose, and which imposes fewer overhead costs, is a localized scheduling method. According to a localized scheduling method, each local channel server has a corresponding queue, designated as 42-1 through 42-k. When a job request is received by one of the local channel servers, that local channel server stores the job request in its corresponding queue along with other pending job requests which it has received from central server 10 but which have not yet been serviced. Central server 10 determines which local channel server to dispatch the job request to by employing a load balancing algorithm. Although there are various definitions of "load", generally a central server which employs a load balancing algorithm assigns each new job to the local channel server that has the fewest pending bytes in its queue waiting to be serviced. In another prior art scheme, the central server employs a load balancing algorithm and assigns each new job to the local channel server that has the fewest number of jobs in its queue waiting to be serviced.

Additionally, according to a localized scheduling scheme, each local channel server also employs a scheduling algorithm in order to determine which of the jobs pending in its corresponding queue are to be serviced first. One scheduling algorithm which is typically employed by the local channel servers is a first-in first-out scheme. However, this arrangement may be unsatisfactory, specifically with widely heterogeneous data requests, because a large job request which arrives early may prevent small, later-arriving job requests from being serviced until after the large job request has been completely serviced (heterogeneous data requests are data requests of varying sizes).

Another scheduling algorithm which is typically employed by the local channel servers is the "Shortest Remaining Processing Time" (hereinafter referred to as "SRPT") algorithm. The SRPT algorithm produces a schedule which minimizes the time it takes to process all of the uncompleted jobs in a queue when there is a single processor that schedules a queue of pending jobs for service via a single channel. The SRPT algorithm is typically employed when jobs arrive in a continuous stream, and is based upon a sum-flow metric. The relevant parameter of the sum-flow metric is the time a job spends in the system. The SRPT algorithm employs the sum-flow metric by summing the time that all jobs spend in the system, and schedules the pending jobs so as to minimize this summed amount of time.

However, the SRPT algorithm has the drawback that it leads to starvation. Starvation occurs when some job request to the server is delayed to an unbounded extent. For instance, starvation may occur when the servicing of a pending job request is continually delayed because the SRPT algorithm determines that incoming job requests are serviced prior to the pending job request. Although the SRPT algorithm can be desirable in some circumstances, the fact that specific job requests are delayed to an unbounded extent is unfair to the person who made the request which is delayed. Furthermore, the fact that some job requests are delayed to an unbounded extent prevents the owner of the server system from being able to make a quality-of-service guarantee to each user that the schedule will be responsive to each job and avoid starvation of any job.

Although the above-referenced scheduling methods have attempted to address data server performance issues, there is an ever increasing need for improved scheduling methods that provide satisfactory performance. Therefore, there exists a need for a system and method for optimally scheduling the transmission of data items in multiple-channel, point-to-point communication system.

SUMMARY OF THE INVENTION

In accordance with one embodiment, a system and method is disclosed for scheduling the servicing of job requests in a localized point-to-point communication system having a central server providing job requests to a plurality of local channel servers. In a first step, the method receives a new job request at the central server. A performance of each channel is measured based upon a predetermined performance metric, and the job request is dispatched to one of the channels for servicing thereby dependent upon the performance of each of the channels. In this context, a performance metric is a quantitative measure of data flow through each channel.

In one embodiment, referred to as the minimum flow algorithm, the job request is dispatched by the central server to the local channel server having the lowest current average flow time. Flow is a measurement of the amount of time required to service a job. Thus, flow is equal to the difference between an arrival time of a job request and a completion time of a job request. When a job request is completed by a local channel server, the server calculates the flow for that job, then calculates an average flow for all of the jobs that the server has completed so far.

In another embodiment, referred to as the minimum stretch algorithm, the job request is dispatched by the central server to the channel having the lowest current maximum stretch value. A stretch value is a ratio equal to an amount of time required to service a job request while also serving other uncompleted job requests, divided by an amount of time required to service the same job request if no other job requests were required to be serviced. In other words, a stretch value provides an indication of the delay experienced by each job request to complete, when the server processes many job requests concurrently. Each local channel server maintains a record of its current maximum stretch value in order to schedule the job requests pending in its queue.

Additionally, each local channel server also employs a scheduling algorithm in order to determine which of the jobs pending in its corresponding queue are to be serviced first. According to one embodiment, an SRPT scheduling algorithm is employed by a local channel server, which sums the time that all jobs spend in the system and schedules the pending jobs so as to minimize this summed amount of time. According to another embodiment, a MAX scheduling algorithm is employed by a local channel server, which schedules the pending jobs in its queue so as to minimize the stretch experienced by each job request serviced thereby.

Both the minimum stretch and the minimum flow algorithm of the present invention outperform the prior art load balancing algorithm with respect to the average stretch and the average response time experienced by the job requests in the system.

BRIEF DESCRIPTION OF THE DRAWINGS

The present invention will be further understood from the following description with reference to the accompanying drawings, in which.

DETAILED DESCRIPTION OF THE INVENTION

In accordance with one embodiment, the present invention comprises a system and method for scheduling the servicing of job requests in a multiple-channel, point-to-point communication system which employs a localized scheduling arrangement.

As previously discussed, in FIG. 1, devices 30a through 30w make requests for data which are delivered to central server 10 by any method. For instance, the requests for data can be made via wireless interface, over phone lines, by computer interface, etc. Specifically, device 30a makes a job request for data item a, device 30b makes a job request for data item b, and device 30w makes a job request for data item w.

Figure 2:
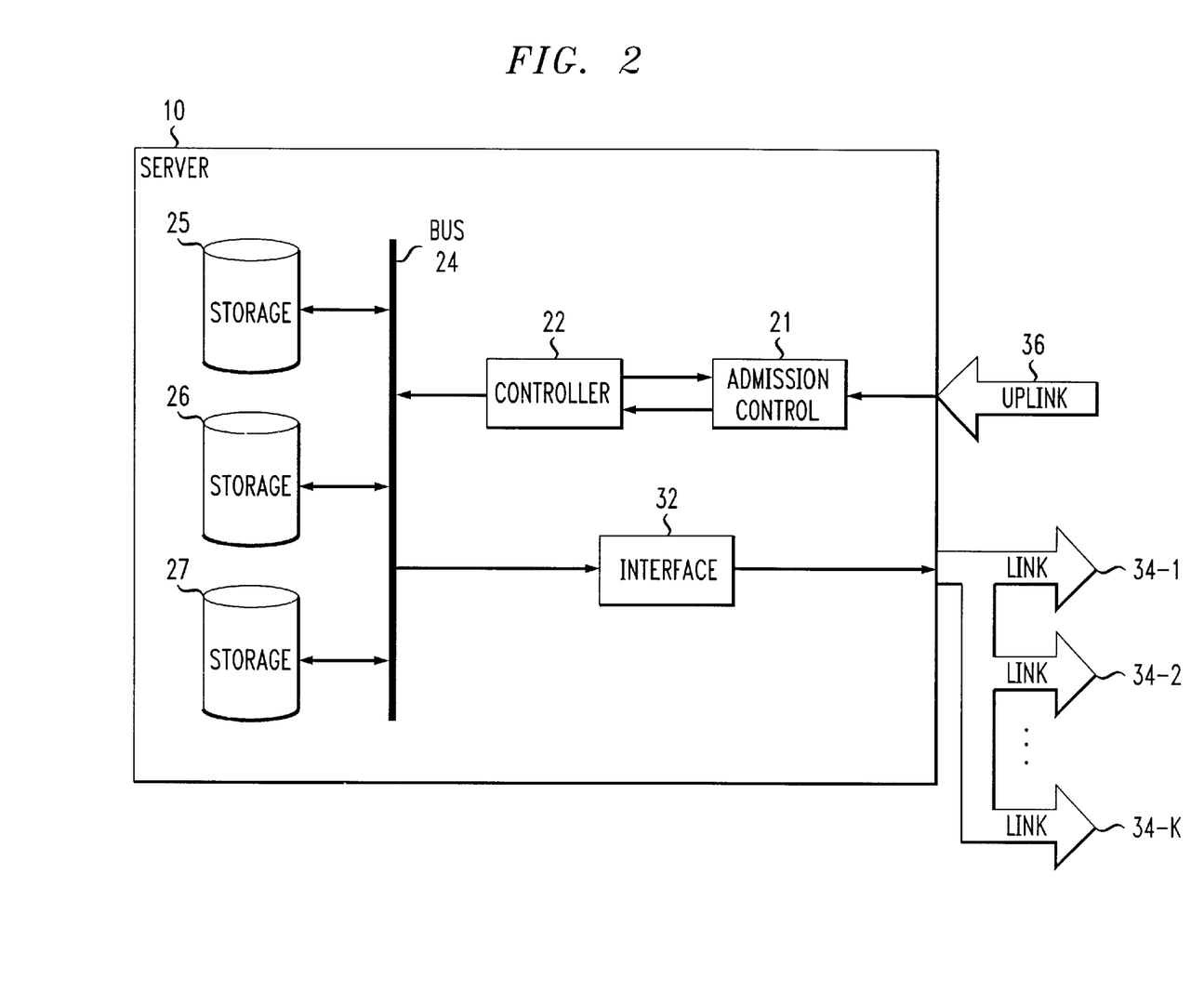
FIG. 2 illustrates the components of a central server, in accordance with one embodiment of the present invention.

Central server 10 receives the job requests and retrieves the requested data from either an internal database or an external database (as will be shown in FIG. 2). Central server 10 then transmits the job requests, according to a dispatch algorithm, to one of a plurality of local channel servers, designated as 40-1 through 40-k. Each local channel server has a corresponding data channel, designated as 44-1 through 44-k. When the requested data is received by one of the local channel servers, the local channel server stores the job request in its corresponding queue (designated as 42-1 through 42-k), schedules the jobs in the queue, and then services the job by transmitting the requested data to the requesting device via its corresponding channel.

FIG. 2 illustrates the salient features of central server 10 that employs various embodiments of the present invention. The scheduling arrangement of the present invention may be employed in any localized multiple-channel, point-to-point server system that is configured to receive a plurality of job requests.

In FIG. 2, central server 10 is configured to transmit data items via links 34-1-k to a plurality of local channel servers in response to requests received from clients via link 36. As shown in FIG. 1, these requests may take the form of requests for data items a, b and w by client devices 30a, 30b and 30w, respectively. According to one embodiment, central server 10 includes a plurality of storage devices such as 25–27, which are configured to provide the plurality of data items upon request.

Central server 10 includes, in one embodiment, an admission control circuit 21, which is configured to analyze an incoming request and determine whether the request will be acknowledged or denied. The request might be denied for any number of reasons, e.g.—the person making the request is not authorized to make the request, the request is incompatible with the server system, etc. An input port of admission control circuit 21 is coupled to link 36 which is configured to deliver the job requests. Admission control circuit 21 receives and stores for each job request, among other things, the time the request arrives, the length of the request, the data item requested, and the bandwidth or data rate necessary to serve the request.

In accordance with one embodiment of the invention, controller 22 is a microprocessor. An input port of controller 22 is coupled to an output port of admission control circuit 21. Additionally, an output port of controller 22 is coupled to an input port of admission control circuit 21. Controller 22 employs one scheduling arrangement described herein, and determines which local channel server to transmit the job request to for servicing thereby.

Storage devices 25–27 are configured to provide data to an internal bus system 24 in response to signals provided by controller 22, although the invention is not limited in scope in that respect.

Data retrieved from storage devices 25–27 is provided to the local channel servers via interface unit 32 and links 34-1-k.

It should also be noted that, although one embodiment of the invention is disclosed in the context of discrete functioning elements such as an admission control circuit and a controller, it is understood that different discrete functioning elements or software could be employed to carry out the present invention.

The system of the present invention employs a localized scheduling arrangement to determine the order in which the job requests are serviced. Each local channel server has a corresponding queue. When a job request is received by one of the local channel servers, the local channel server stores the job request in its corresponding queue along with other pending job requests which it has received from the central server but which have not yet been serviced. Each local channel server then employs a scheduling algorithm in order to determine which of the jobs pending in its corresponding queue are to be serviced first.

Prior to being stored and serviced by the local channel servers, incoming job requests are dispatched by central server 10 to one of the local channel servers. Unlike the prior art, in which central server 10 determines which local channel server to dispatch the job request to by employing a load balancing algorithm, central server 10 determines which local channel server to use by measuring a performance of each local channel server. In one embodiment of the present invention, central server 10 determines which local channel server to dispatch the job request to by employing a minimum flow dispatching algorithm. In another embodiment of the present invention, central server 10 determines which local channel server to dispatch the job request to by employing a minimum stretch dispatching algorithm.

According to the minimum flow algorithm, central server 10 transmits each incoming job request to the local channel server which has the lowest current average-flow compared to all of the other local channel server. Flow is a measurement of the amount of time required to service a job. Thus, flow is equal to the difference between an arrival time of a job request and a completion time of a job request. When a job request is completed by a local channel server, the server calculates the flow for that job, then calculates an average flow for all of the jobs that the server has completed so far.

Figure 3:
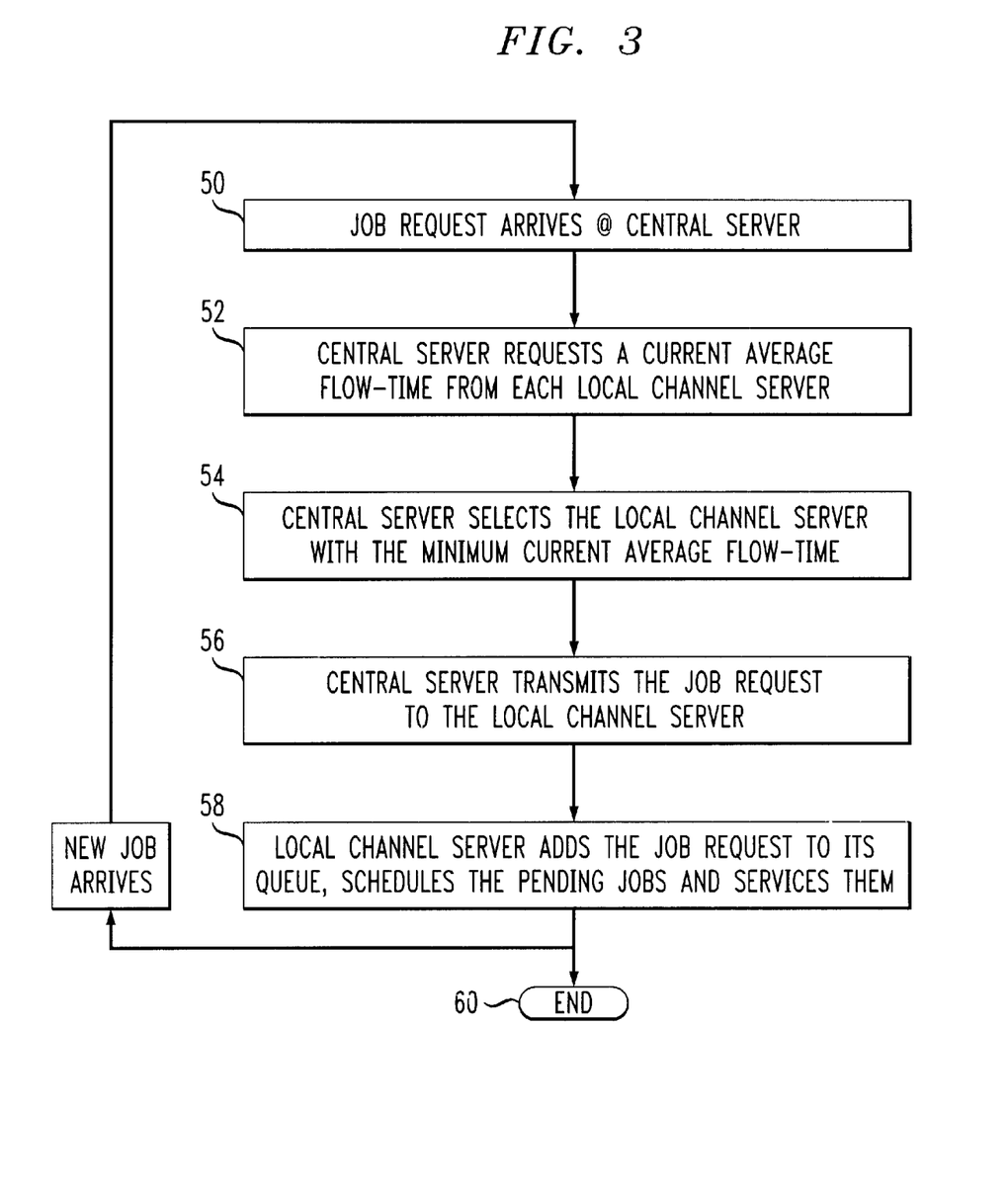
FIG. 3 is a flowchart that illustrates the steps performed by a central server which employs the minimum flow algorithm, according to one embodiment of the invention.

FIG. 3 is a flowchart that illustrates the steps performed by central server 10 which employs the minimum flow algorithm, according to one embodiment of the invention. At step 50, a new job request arrives at central server 10. At step 52, central server 10 requests a current average flow time from each local server. As previously mentioned, the average flow-time is equal to the average of the differences between an arrival time of each job request serviced by a local channel server and a completion time of that job request.

At step 54, central server 10 selects the local channel server with the minimum current average flow-time. At step 56, central server 10 transmits the new job request to the local channel server selected in step 54. At step 58, the local channel server adds the job request to its queue of pending job requests, schedules the pending job requests according to its local scheduling algorithm, and services them in accordance with the schedule. As will be discussed in greater detail below, the local channel server may employ various algorithms for this purpose, such as the MAX or SRPT algorithms.

Figure 5:
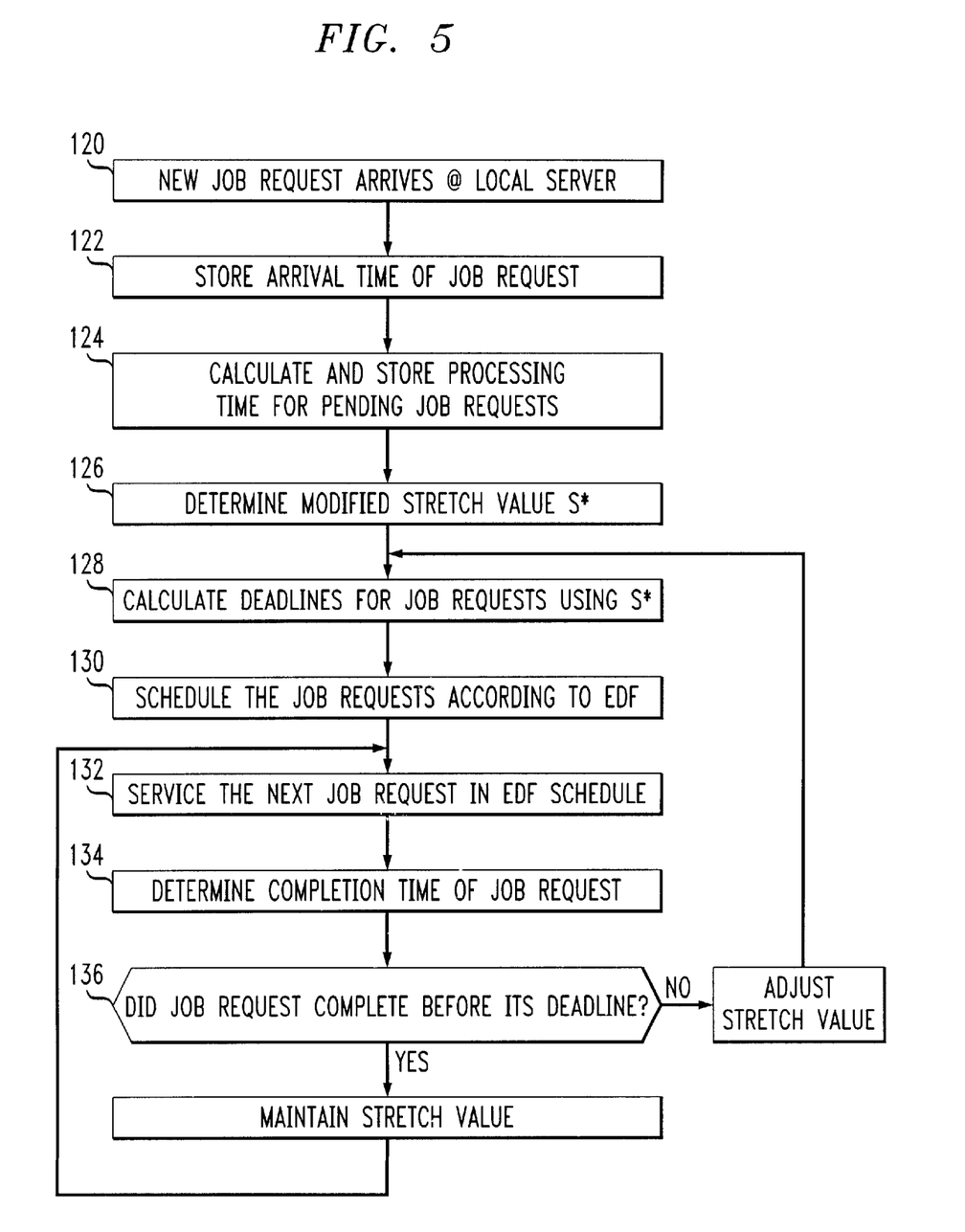
FIG. 5 is a flow chart which illustrates the steps of scheduling and processing a plurality of job requests in the on-line setting, in accordance with one embodiment of the present invention.

According to the minimum stretch algorithm, central server 10 transmits each incoming job request to the local channel servers which has the lowest current maximum stretch value compared to all of the other local channel servers. A stretch value is defined herein as a ratio equal to the time that the local channel server requires to service a particular job request while also serving other uncompleted job requests in its queue, divided by the time the server would require to service that particular job request if no other job requests were required to be serviced. Each local channel server maintains a record of its current maximum stretch value in order to schedule the job requests pending in its queue. The method by which each local channel server maintains a record of its current maximum stretch value is illustrated in FIG. 5.

Figure 4:
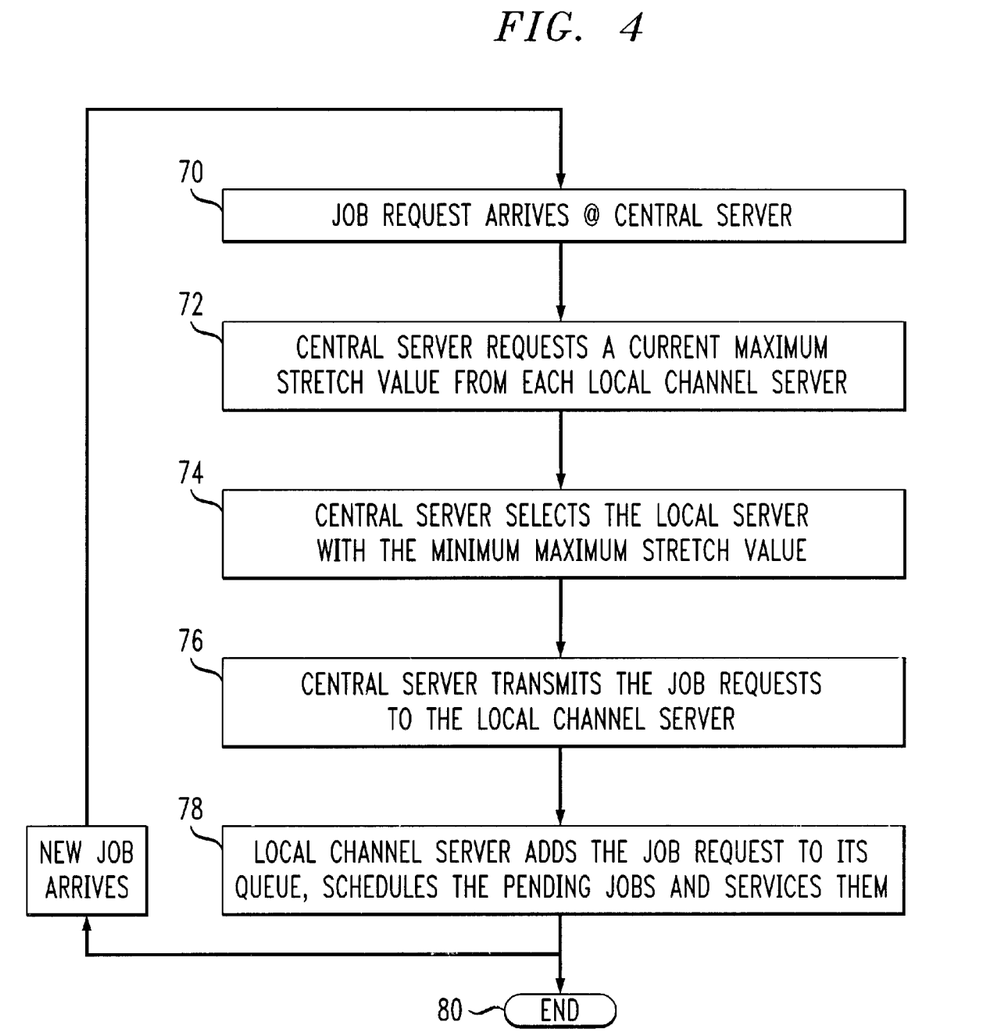
FIG. 4 is a flowchart that illustrates the steps performed by a central server which employs the minimum flow algorithm, according to one embodiment of the invention.

FIG. 4 is a flowchart that illustrates the steps performed by central server 10 which employs the minimum stretch algorithm, according to one embodiment of the invention. At step 70, a new job request arrives at central server 10. At step 72, central server 10 requests a current maximum stretch value from each local server. As previously mentioned, a stretch value provides an indication of the delay experienced by each job request to complete, when the server processes many job requests concurrently.

At step 74, central server 10 selects the local channel server with the minimum current maximum stretch value. At step 76, central server 10 transmits the new job request to the local channel server selected in step 74. At step 78, the local channel server adds the job request to its queue of pending job requests, schedules the pending job requests according to its local scheduling algorithm, and services them in accordance with the schedule. As previously mentioned and as will be discussed in greater detail below, the local channel server may employ various algorithms for this purpose, such as the MAX or SRPT algorithms.

As previously mentioned, each local channel server employs its own scheduling algorithm to schedule the job requests pending in its corresponding queue. In one embodiment, each local channel server employs the same scheduling algorithm as all of the other local channel servers, although the present invention is not limited in this regard, i.e.—local channel servers may employ different scheduling algorithms. One scheduling algorithm which is employed by the local channel servers is the SRPT algorithm. Another scheduling algorithm which is employed by the local channel servers is the MAX algorithm. Both of these algorithms are on-line algorithms. An on-line algorithm is one in which the system does not have prior knowledge of the arrival times of future job requests, and in which the controller determines a schedule, based upon job requests which have previously been processed, while simultaneously processing the currently pending job requests. The steps conducted by one embodiment of the present invention, which employs an on-line scheduling arrangement, are shown and described in FIG. 6. An on-line algorithm is unlike an off-line algorithm, in which a series of calculations to find the optimal schedule is performed prior to actually servicing the job requests.

As previously discussed, the SRPT algorithm, as employed by the local channel servers, produces a schedule which minimizes the time it takes to process all of the uncompleted jobs in the local channel server's queue. The SRPT algorithm is typically employed when jobs arrive in a continuous stream, and is based upon a sum-flow metric. The relevant parameter of the sum-flow metric is the time a job spends in the system. The SRPT algorithm employs the sum-flow metric by summing the time that all jobs spend in the system, and schedules the pending jobs so as to minimize this summed amount of time.

In another embodiment of the present invention, each local channel server employs a MAX algorithm to determine the order in which job requests in its queue are serviced. FIG. 5 is a flow chart which illustrates the steps performed by each local channel server according to the MAX algorithm. At step 120 of the flow chart, a new job request arrives at a local channel server. Typically in the on-line setting, the local channel server will currently be servicing a plurality of pending job requests when the new request arrives. At step 122, the arrival time, $A_i$, of the newly arrived job request is stored by the local channel server.

At step 124, the local channel server calculates and stores a processing time, $P_i$, of the arrived job request. The processing time for a job request is the amount of time it would take for the server to complete the job request if the server could service the job request immediately and without interruption, i.e.—without the job request waiting for other jobs to finish before starting, and without the service of the job request being preempted to service other requests. In a preferred embodiment, the local channel server calculates the processing time as a function of the size of the data items, such as by dividing the size (i.e.—in bytes) of the data item requested by the transmission speed of the channels (e.g.—in bytes per second).

In accordance with one embodiment of the invention, instead of considering all of the job requests arrived to the server, the local channel server considers the job requests that have arrived during a history window, defined by a history window parameter. A history window parameter comprises a specified set of job requests having n number of job requests, where n is an integer. The value of n is advantageously chosen by the operator of the system. While it is possible that n equals the total number of jobs serviced by the system, it may be desirable to avoid storing or calculating arrival times and processing times for the entire history at every arrival. Therefore, in one embodiment, n is a finite number in the range of 10 to 100, corresponding to the last 10 to 100 jobs which were serviced by the system immediately proceeding the arrival of the presently arrived job. Not only does the selection of an n value in this range control the cost of scheduling, but also prevents a momentary surge of arrivals a long time ago from inducing the controller to compute a large processing time ratio ever after.

At step 126, the local channel server determines a modified stretch value, $S^*$. As previously indicated, a stretch value provides an indication of the delay experienced by each job request to complete when the server processes many job requests concurrently. Specifically, a stretch value exists because, in the preferred embodiment of the invention, each local channel server employs preemption. Preemption is a scheduling technique in which a server alternates between a plurality of different pending job requests, servicing portions of each job request until eventually all of the job requests are complete. Thus, the stretch value is defined herein as a ratio equal to the time that the local channel server requires to service a particular job request while also serving other uncompleted job requests in its queue, divided by the time the server would require to service that particular job request if no other job requests were required to be serviced. Initially, the proposed stretch value can be a random or arbitrarily chosen number or can be based on previously found stretch values.

The modified stretch value $S^*$ is the maximum stretch value for a completed job request found during a specified history window parameter. At step 128, the server uses the modified stretch value, $S^*$, to calculate the deadlines, D, for all of the uncompleted jobs remaining to be serviced. For an uncompleted job request i, the deadline, $D_i$, is equal to the arrival time of that job, $A_i$, plus the product of the modified stretch value, $S^*$, times the processing time, $P_i$, such that:

$$D_i = S^* \times P_i + A_i.$$

At step 130, in accordance with one embodiment of the present invention, the local channel server schedules the pending jobs in accordance with an EDF methodology. According to the EDF schedule, the job request with the earliest deadline, as calculated in step 128, is scheduled to be serviced first, then the job request with the second earliest deadline is scheduled to be serviced second, etc.

At step 132, the local channel server services the job request, according to the EDF schedule determined in step 130 via its corresponding channel. The server transmits the data to the client that requested the data item. At step 134, according to one embodiment, the local channel server determines the completion time of the job request.

At step 136, the server determines if, at the modified stretch value, $S^*$, the completed job request was completed prior to its respective deadline. If so, the modified stretch value is feasible and the system proceeds to step 140, where the server maintains the current modified stretch value. The method then returns to step 132. At step 132, the local channel server services the next job request, according to the EDF schedule determined in step 130.

If, using the modified stretch value, $S^*$, the completed job request is not completed prior to its corresponding deadline, then the modified stretch value is not feasible. The method then proceeds to step 138, and the modified stretch value is adjusted. After step 138, the method then returns to step 128, and the method repeats, i.e.—the local channel server recalculates the deadlines for all of the uncompleted jobs remaining to be serviced in its queue, reschedules the job requests according to the EDF methodology, and services the job requests. However, in accordance with an alternative embodiment of the invention, the deadlines calculated in step 128 remain constant even after the modified stretch value is adjusted at step 138, and the adjusted modified stretch value is used to calculate deadlines for the newly arriving job requests only.

As may be the case, a subsequent job request will arrive at the local channel server to be serviced while the local channel server is processing an existing job request. If this is the case, then the local channel server returns to step 120 of the flow chart to re-perform steps 120 through 140. Thus, the EDF schedule of pending jobs also includes the newly arrived job request.

In one embodiment of the invention, the adjustment at step 138 (of the flowchart in FIG. 5) to the proposed stretch value is accomplished by doubling the previously proposed stretch value. In yet another embodiment, once the local channel server determines that a feasible stretch value falls between two integers, k and 2k, the feasible stretch value is adjusted further by performing a binary search for an optimal feasible stretch value. The optimal feasible stretch value is the smallest feasible stretch value that enables all of the job requests, when scheduled in step 130 according to the EDF methodology, to be completed within their respective deadlines (as calculated in step 126).

The method discussed above utilizes the EDF methodology to schedule the job requests. It is possible, however, to use other scheduling methodologies. For instance, the SRST method, which schedules the pending job requests according to the remaining time to process each request, can be utilized. It is also noted, that although in the preferred embodiment the present invention each channel employs a same scheduling arrangement, the present invention contemplates the employment of multiple channels, each employing a different scheduling arrangement.

As previously mentioned, the present invention seeks to find a schedule that balances the conflicting requirements of the individual performance for each job request with the global performance of the system, such that the system is responsive to each job request and avoids starvation of any job request. In other words, the optimal schedule balances the need to minimize the worst case completion time of a job request and the need to minimize the average response time for the job requests. In addition, the optimal schedule balances the need to minimize the worst case stretch of a job request and the need to minimize the average stretch values for all of the job requests.

Figure 6:
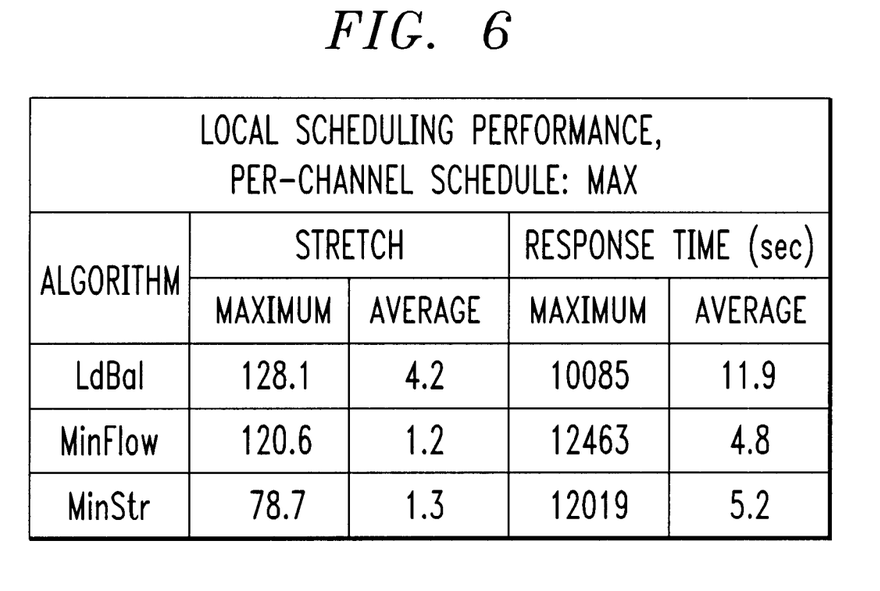
FIG. 6 is a table that illustrates the performance of the load balancing, minimum flow and minimum stretch algorithms as employed by a central server that dispatches job requests to a plurality of local channel servers, wherein the local channel servers corresponding to each channel employ the MAX scheduling algorithm, in accordance with one embodiment of the present invention.

In order to measure the effectiveness of the minimum flow and minimum stretch dispatching algorithms as employed by a central server in a localized scheduling scheme, their performance can be compared to the load balancing algorithm of the prior art. FIG. 6 illustrates the performance of the load balancing (designated as "LdBal"), minimum flow and minimum stretch algorithms as employed by a central server that dispatches job requests to a plurality of local channel servers, wherein the local channel servers employ the MAX scheduling algorithm to schedule the servicing of job requests in their respective queues. The performance results were determined for a model in which a total downlink bandwidth of 128 Kbits/second was employed, divided between a number of channels ranging from 5 to 20 channels (thus rendering the bandwidth of each channel within a range between 6.4 and 25.6 Kbits/second). Specifically, the simulation employed the logs from the IRCACHE project of the U.S. Supercomputer Center in San Diego, and consisted of 75,000 accesses for 52,000 distinct objects ranging in size from 17 bytes to 20 MB.

While the load balancing algorithm has the best performance with respect to the maximum response time, at 10,085 seconds, it has the worst performance of the three central dispatching algorithms with respect to all other performance metrics. Specifically, the load balancing algorithm has an average response time of 11.9 seconds, a maximum stretch value of 128.1 and an average stretch value of 4.2. Of the three algorithms, the minimum flow algorithm has the best average stretch value, at 1.2, and the best average response time, at 4.8 seconds, while the minimum stretch algorithm is comparable to this performance, having an average stretch value of 1.3 and an average response time of 5.2 seconds. The minimum stretch algorithm has the best maximum stretch value, at 78.7, compared to 120.6 for the minimum flow algorithm and 128.1 for the load balancing algorithm.

Figure 7:
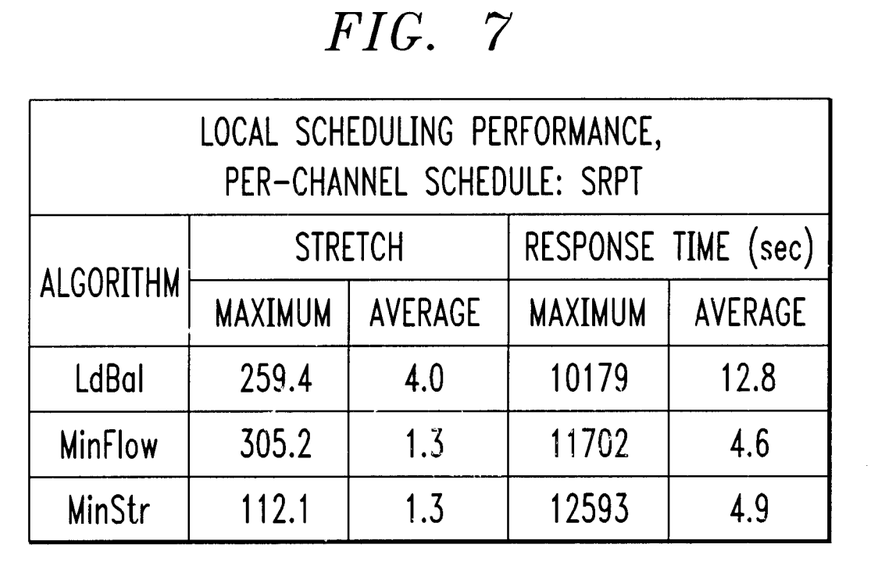
FIG. 7 is a table that illustrates the performance of the load balancing, minimum flow and minimum stretch algorithms as employed by a central server that dispatches job requests to a plurality of local channel servers, wherein the local channel servers corresponding to each channel employ the SRPT scheduling algorithm, in accordance with one embodiment of the present invention.

FIG. 7 illustrates the performance of the load balancing, minimum flow and minimum stretch algorithms as employed by a central server, wherein the local channel servers corresponding to each channel employ the SRPT scheduling algorithm to schedule the servicing of job requests in their respective queues. While the load balancing algorithm again has the best performance with respect to the maximum response time, at 10,179 seconds, it performs poorly with respect to the other metrics. Specifically, the load balancing algorithm has an average response time of 12.8 seconds, a maximum stretch value of 259.4 and an average stretch value of 4.0. Of the three algorithms, the minimum flow algorithm has the best average response time, at 4.6 seconds, while the minimum stretch algorithm is comparable to this performance, having an average response time of 4.9 seconds. The minimum flow and minimum stretch algorithms both have an average stretch value of 1.3. The minimum stretch algorithm has the best maximum stretch value, at 112.1, which is far superior when compared to 305.2 for the minimum flow algorithm and 259.4 for the load balancing algorithm.

It is important when making a quality of service guarantee to clients to minimize the maximum stretch value, since a large maximum stretch value means that job requests in the system are delayed to an unbounded extent. In this respect, the minimum stretch algorithm performs better than the other two algorithms. The minimum stretch algorithm is also comparable to the other algorithms with respect to the other performance metrics, making it the best dispatching algorithm in a localized scheduling arrangement. In addition, it is noted that the performance of the minimum flow and minimum stretch algorithms was improved in every respect except one (average response time) by employing a MAX scheduling arrangement at the local channel server queues instead of an SRPT scheduling arrangement.

While there has been shown and described particular embodiments of the invention, it will be obvious to those skilled in the art that changes and modifications can be made therein without departing from the invention, and therefore, the appended claims shall be understood to cover all such changes and modifications as fall within the true spirit and scope of the invention.

We claim:

1. A method for scheduling the servicing of job requests in a point-to-point communication system having a central server providing job requests to a plurality of local channel servers, the method comprising the steps of:

for each new job request, receiving said job request at said central server;

measuring a flow time for each job request serviced by each of said local channel servers, and storing said flow times for each job request serviced by said local channel servers, measuring an average flow time for all job requests serviced by each of said local channel servers; and dispatching said job request to one of said local channel servers for servicing based on at least said measured average flow time.

2. The method according to claim 1, wherein said dispatching step further comprises dispatching said job request to one of said local channel servers having the lowest average flow time.

3. A method for scheduling the servicing of job requests in a point-to-point communication system having a central server providing job requests to a plurality of local channel servers, the method comprising the steps of:

for each new job request, receiving said job request at said central server;

determining a stretch value for job requests serviced by said local channel server, wherein a stretch value is a ratio equal to an amount of time required to service a job request while also serving other uncompleted job requests, divided by an amount of time required to service said job request if no other job requests were required to be serviced, and dispatching said job request to one of said local channel servers based on at least a lowest stretch value of each of said channels.

4. The method according to claim 3, wherein said step of determining a stretch value further comprises measuring a maximum stretch value for job requests serviced by said local channel server.

5. The method according to claim 1, wherein said method further comprises the steps of:

after said dispatching step, storing said job request in a queue corresponding to said local channel server; and determining an adaptive schedule for servicing said job requests in said queue.

6. The method according to claim 1, wherein said flow is equal to the difference between an arrival time of said job request and a completion time of said job request.

7. The method according to claim 3, wherein said method further comprises the steps of:

after said dispatching step, storing said job request in a queue corresponding to said local channel server; and determining an adaptive schedule for servicing said job requests in said queue.

8. The method according to claim 7, wherein said step of determining an adaptive schedule further comprises the steps of:

for each of said job requests in said queue, calculating a deadline, $D_i$, given by $D_i = S \times P_i + A_i$, wherein $P_i$ is a processing time corresponding to said job request, $A_i$ is an arrival time corresponding to said job request, and S is a stretch value; and determining a schedule for processing said job requests so that each said job request is serviced within its corresponding deadline.

9. The method of claim 8, wherein said processing time comprises a value corresponding to the size of each said job request divided by a channel bandwidth.

10. The method of claim 8, further comprising the step of proposing said stretch value.

11. The method of claim 10, further comprising the step of calculating said deadlines for each of said job requests as a function of said proposed stretch value.

12. The method of claim 11, wherein said scheduling step further comprises scheduling said job requests, at said proposed stretch value, according to an "earliest deadline first" arrangement.

13. The method of claim 12, wherein said stretch value is a feasible stretch value if, when processed in an order dictated by said "earliest deadline first" arrangement, a completion time of each and every said job request is prior to said corresponding deadline for each said job request at said feasible stretch value.

14. The method of claim 13, further comprising the steps of:

iteratively adjusting said stretch value until said stretch value is a feasible stretch value; and after finding said feasible stretch value, processing said job requests in an order dictated by said "earliest deadline first" arrangement, said "earliest deadline first" arrangement corresponding to said stretch values determined in the latest iteration.

15. The method of claim 14, wherein said adjusting step further comprises adjusting said proposed stretch value by doubling said proposed stretch value.

16. The method of claim 15, wherein said feasible stretch value further comprises an optimal feasible stretch value, said method further comprising the step of adjusting said proposed stretch value until a feasible stretch value is found, said optimal feasible stretch value corresponding to the smallest feasible stretch value that permits said each and every job request to have a completion time prior to said deadline of said job request at said optimal feasible stretch value.

17. The method of claim 16, wherein said adjusting step further comprises performing a binary search for said optimal feasible stretch value after said controller determines that said feasible stretch value falls between said proposed stretch value and double said proposed stretch value.

18. The method of claim 1, wherein said plurality of job requests further comprises a set having n number of job requests, wherein n is an integer.

19. The method of claim 18, wherein said integer n has a value that is equal to a total number of job requests processed by said server system.

20. The method of claim 18, wherein said integer n has a value that is less than a total number of job requests processed by said server system.

21. In a point-to-point communication system, a system for scheduling the servicing of job requests comprising:

a plurality of local channel servers, each local channel server having a queue buffer for storing incoming job requests;

a central server coupled to each one of said local channel servers and configured to receive a new job request and to dispatch said new job request to one of said local channel servers for servicing said central server configured to store flow times for each job request serviced by said local channel servers; and said system is configured to measure an average flow time for all job requests serviced by said local channel server, so as to dispatch said job requests to said local channel servers based on at least said measured average flow time.

22. The system according to claim 21, wherein said central server is configured to dispatch said job request to said local channel server having the lowest average flow time.

23. The system according to claim 21, wherein said flow time is equal to the difference between an arrival time of said job requests and a completion time of said job request.

24. In a point-to-point communication system, a system for scheduling the servicing of job requests comprising:

a plurality of local channel servers, each local channel server having a queue buffer for storing incoming job requests;

a central server coupled to each one of said local channel servers and configured to receive a new job request and to dispatch said new job request to one of said local channel servers for servicing, said central server configured to store stretch values for each job request received by said local channel server, wherein a stretch value is a ratio equal to an amount of time required to service a job request while also serving other uncompleted job requests, divided by an amount of time required to service said job request if no other job requests were required to be serviced, said system is configured to dispatch a job request to a local channel server based on at least the lowest stretch value.

25. The system according to claim 24, wherein said system is configured to measure a maximum stretch value for job requests serviced by said local channel server.

26. The system according to claim 25, wherein said central server is configured to dispatch said job request to said local channel server having the lowest maximum stretch value.

* * * * *